S. REINSBERG.
BOTTLING MACHINE.
APPLICATION FILED NOV. 21, 1908.
955,551.
Patented Apr. 19, 1910.
12 SHEETS—SHEET 1.
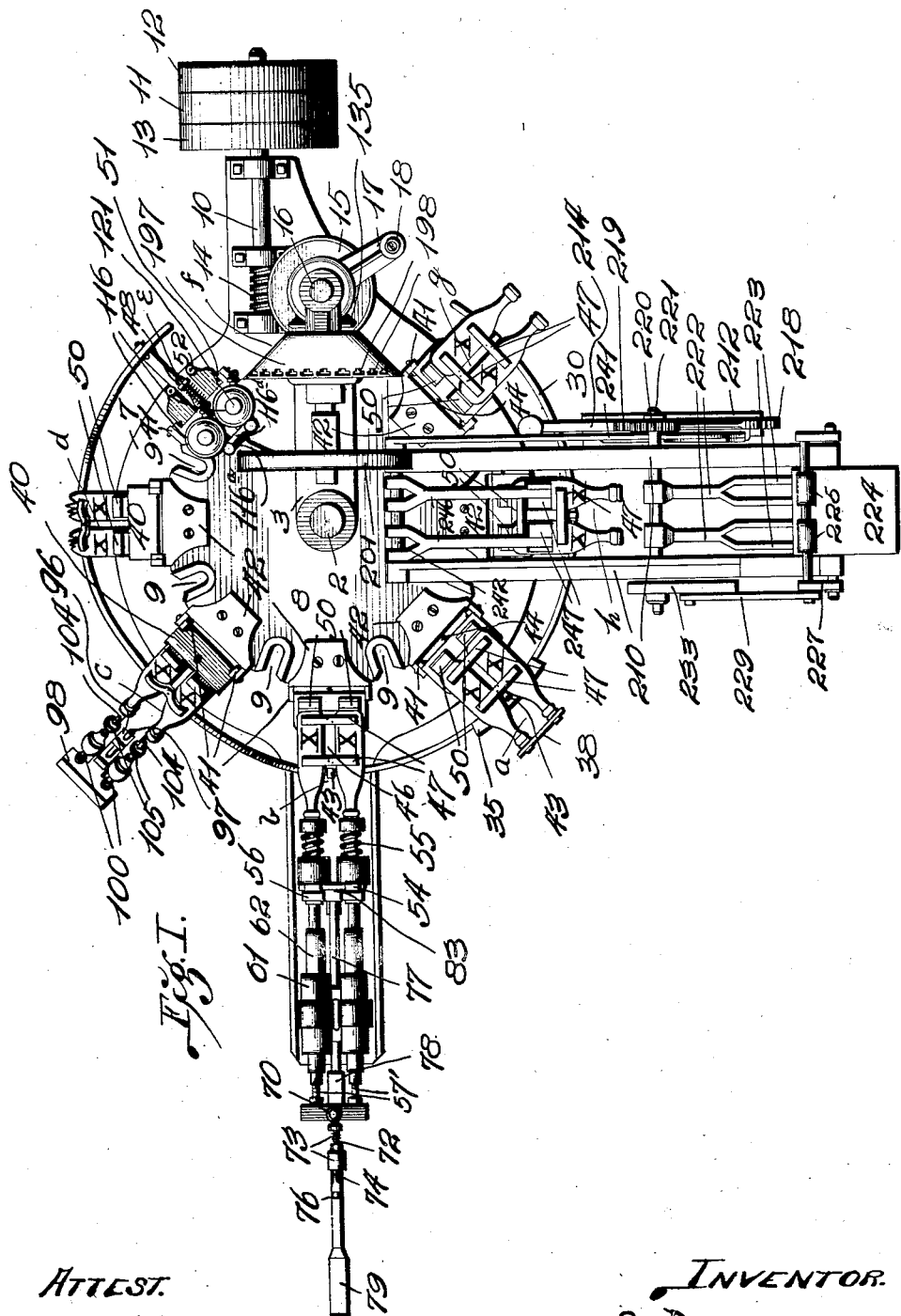
ATTEST.
E. M. Narrington.
N. J. Cook.
INVENTOR.
S. REINSBERG.
BY Geo. H. Knight Atty.

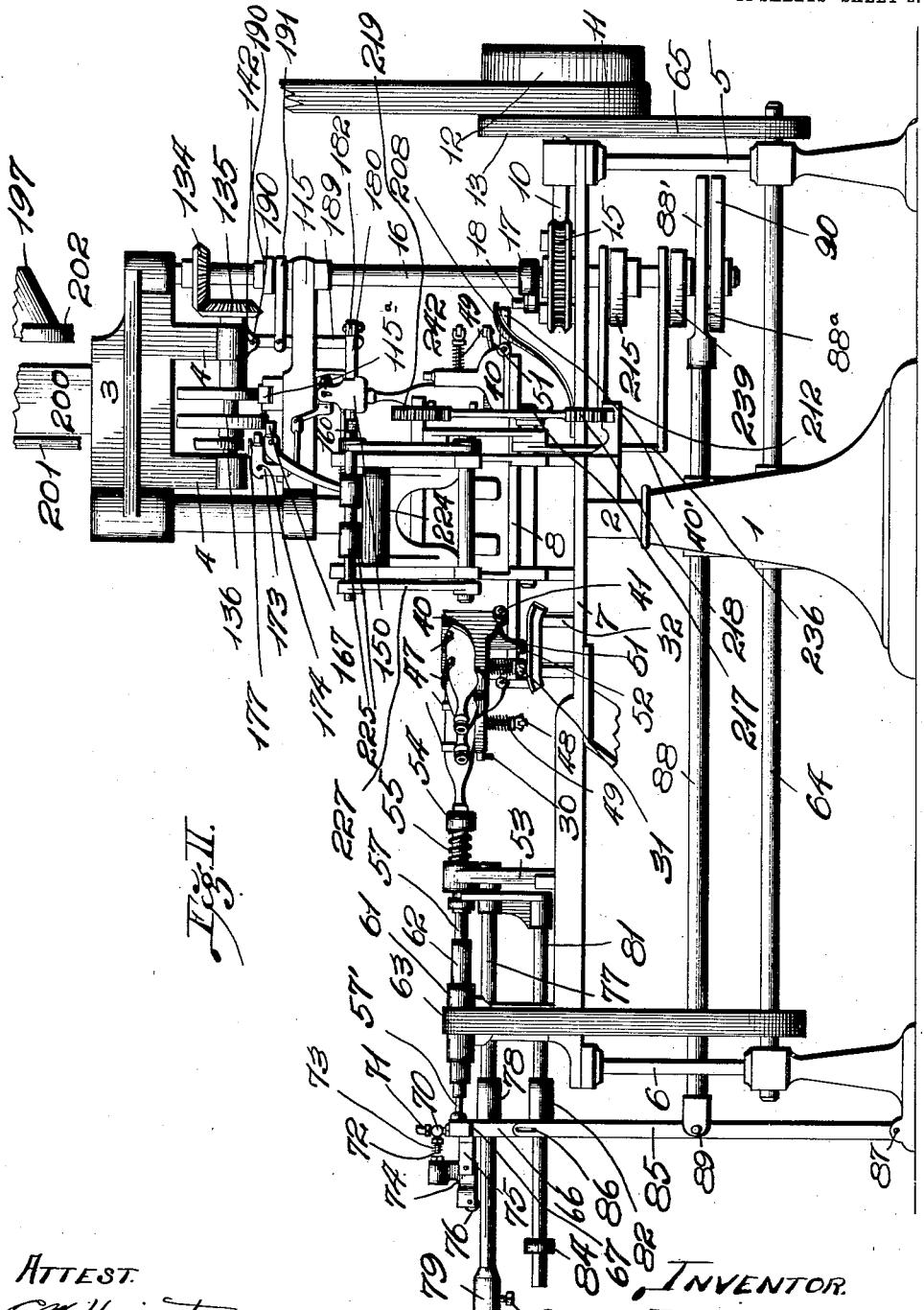

S. REINSBERG.
BOTTLING MACHINE.
APPLICATION FILED NOV. 21, 1908.
955,551.
Patented Apr. 19, 1910.
12 SHEETS—SHEET 3.
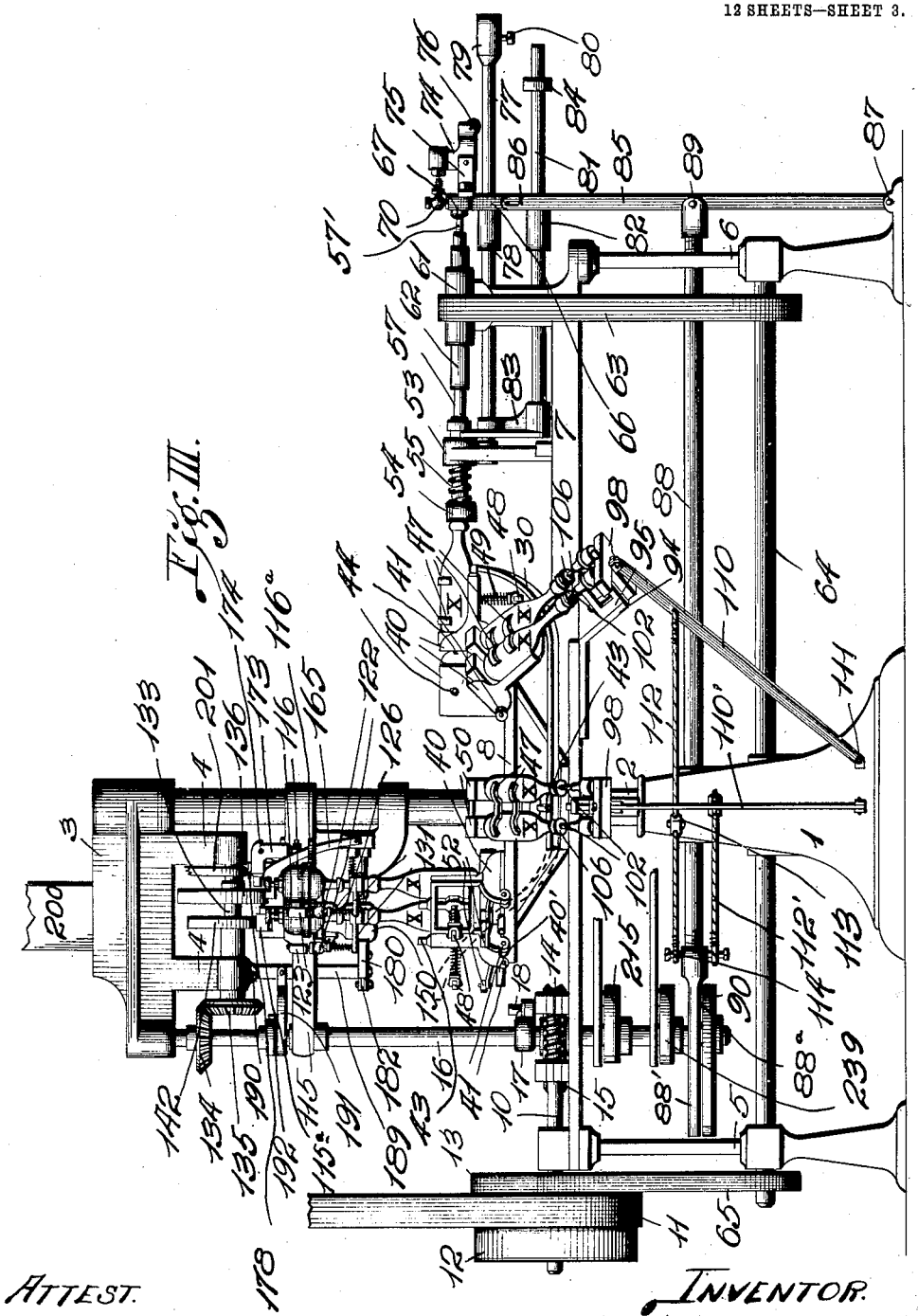

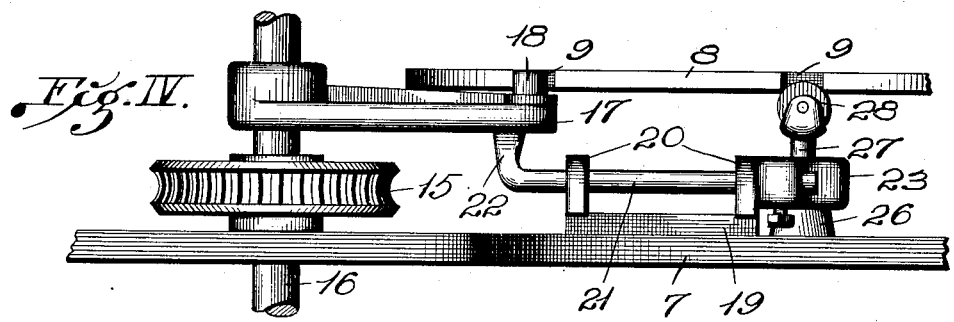
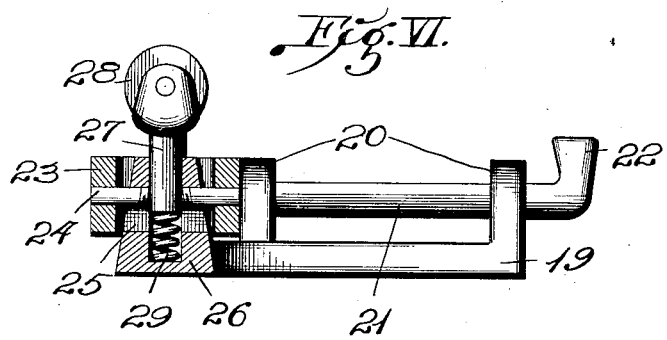
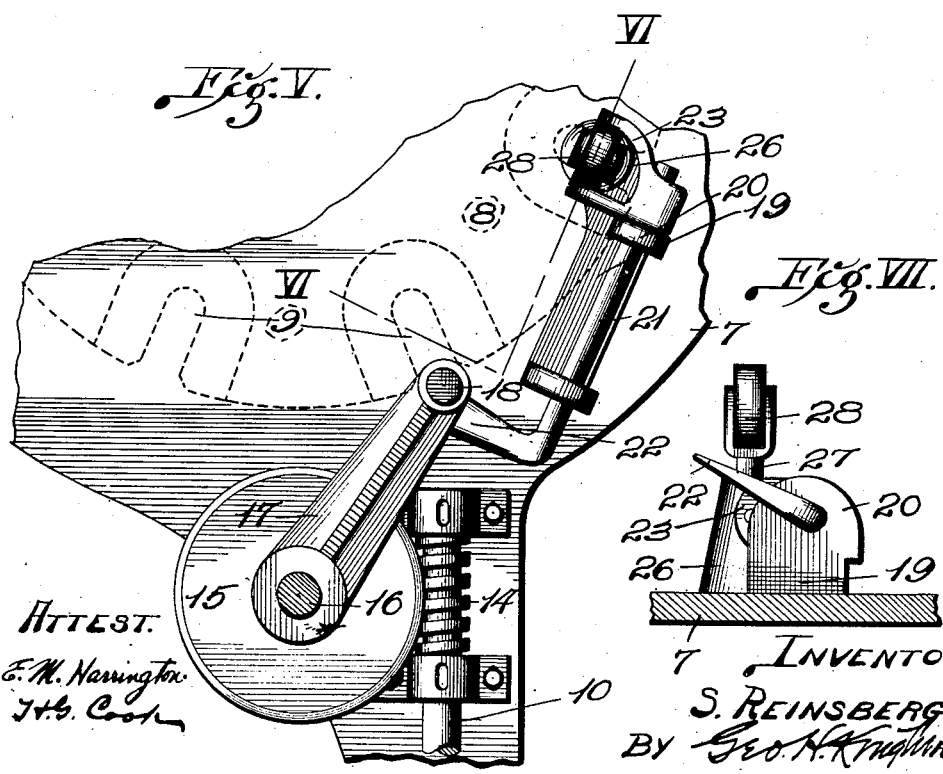

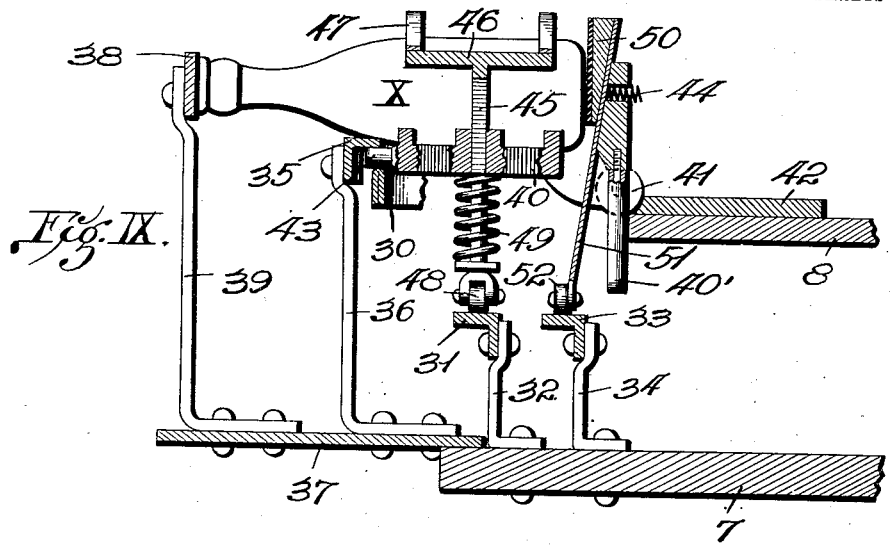
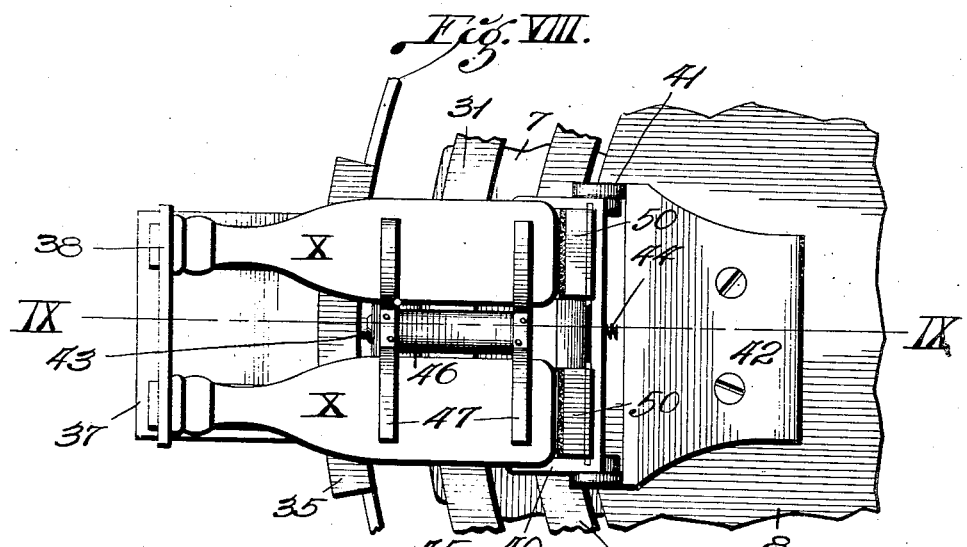
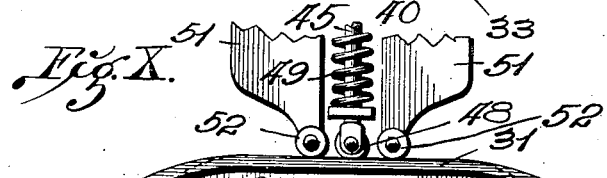

S. REINSBERG.
BOTTLING MACHINE.
APPLICATION FILED NOV. 21, 1908.
955,551.
Patented Apr. 19, 1910.
12 SHEETS—SHEET 6.
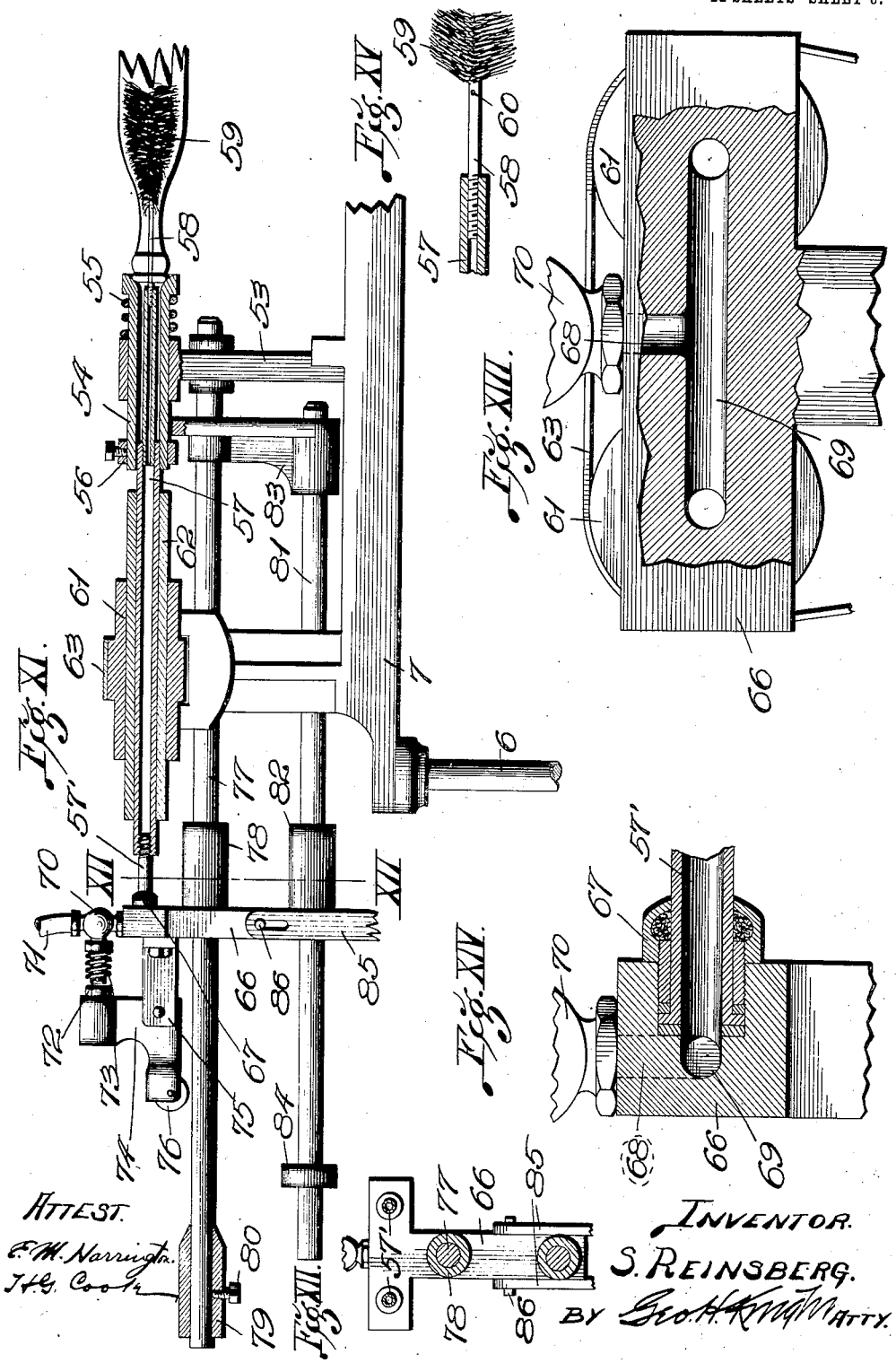

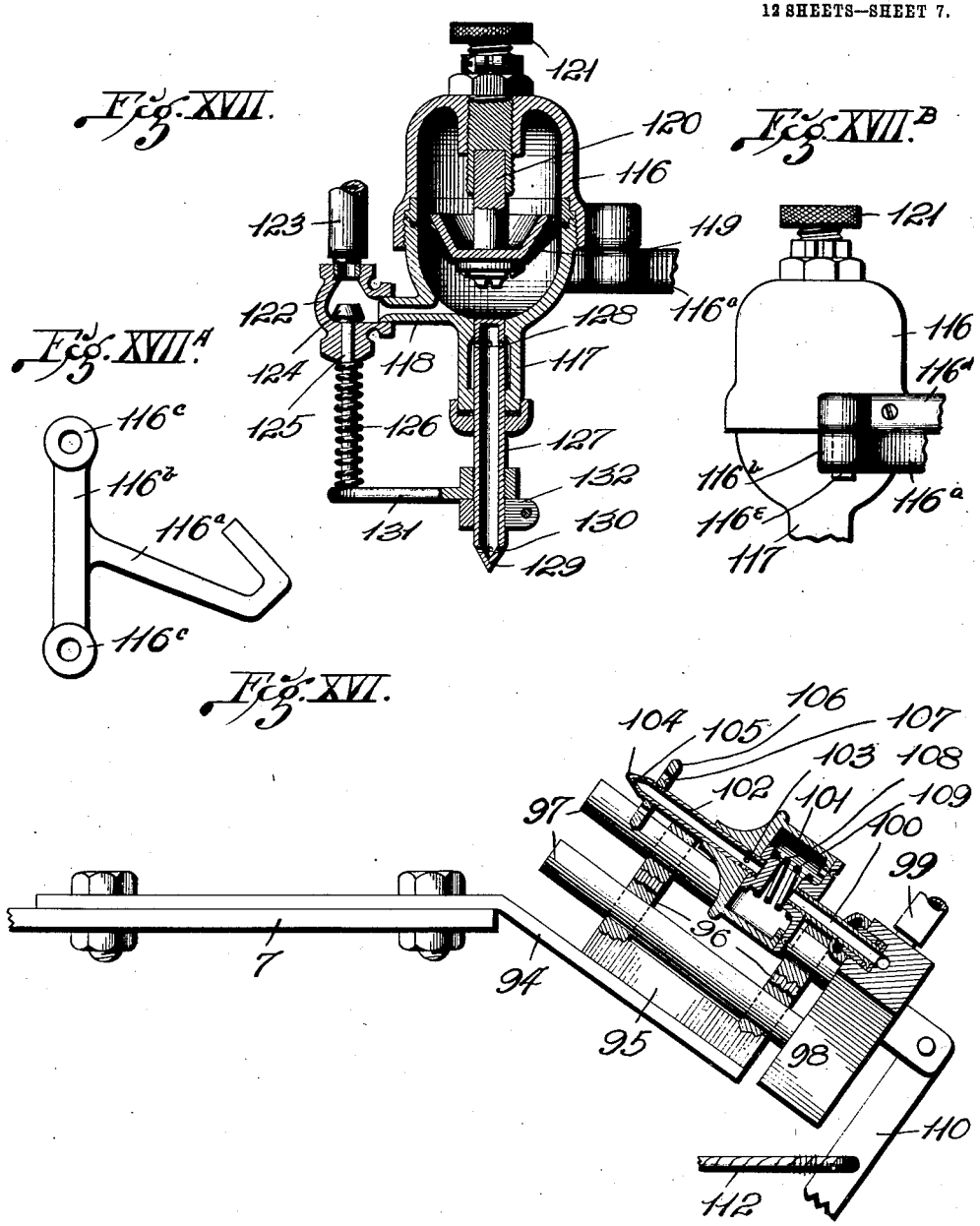

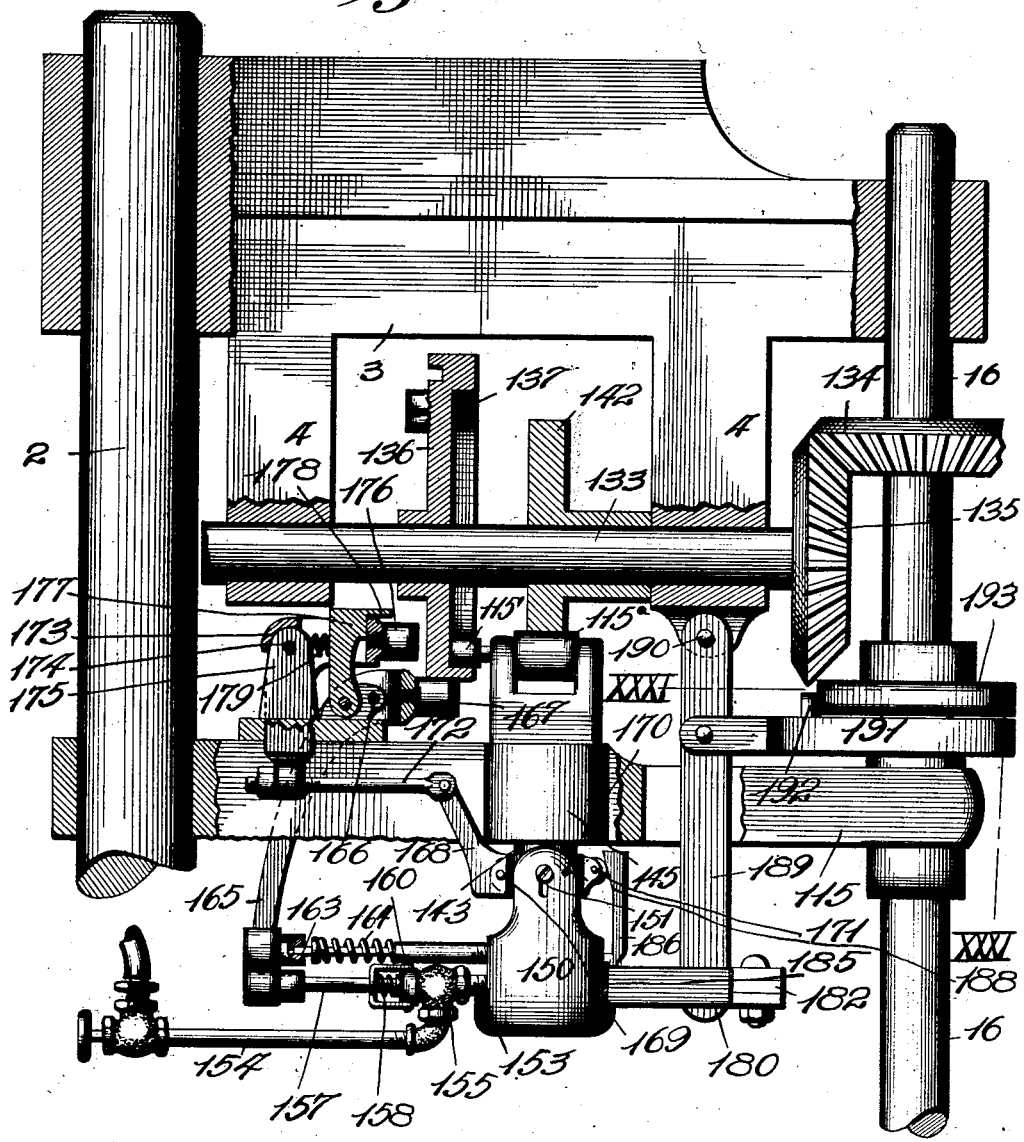

S. REINSBERG.
BOTTLING MACHINE.
APPLICATION FILED NOV. 21, 1908.
955,551.
Patented Apr. 19, 1910.
12 SHEETS—SHEET 9.
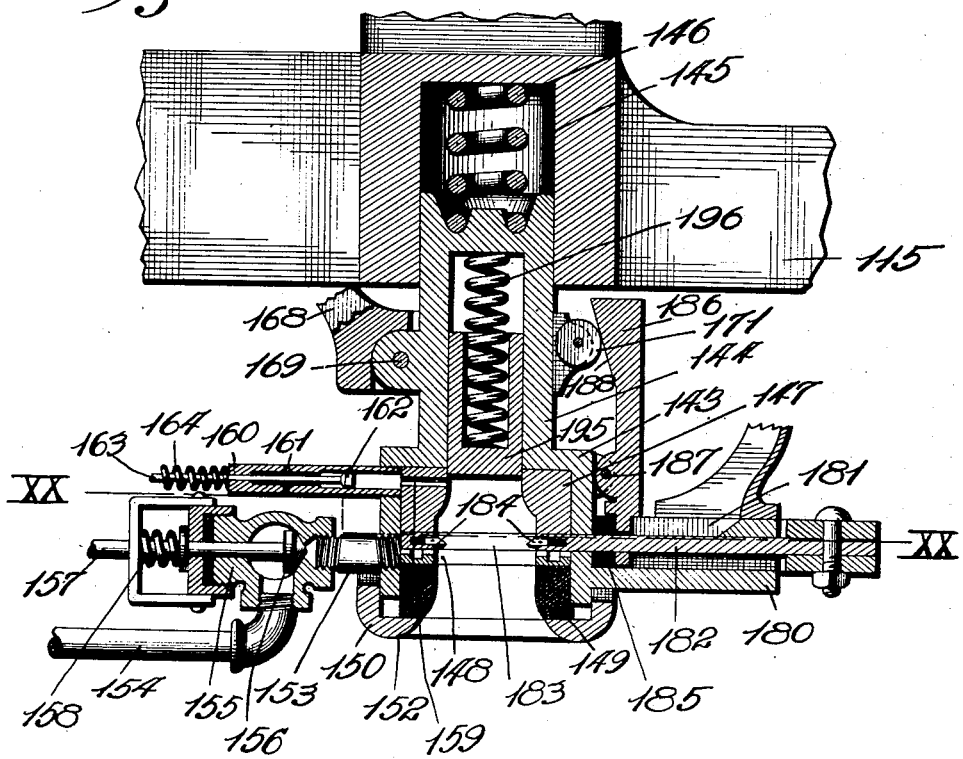
Fig. XIX.
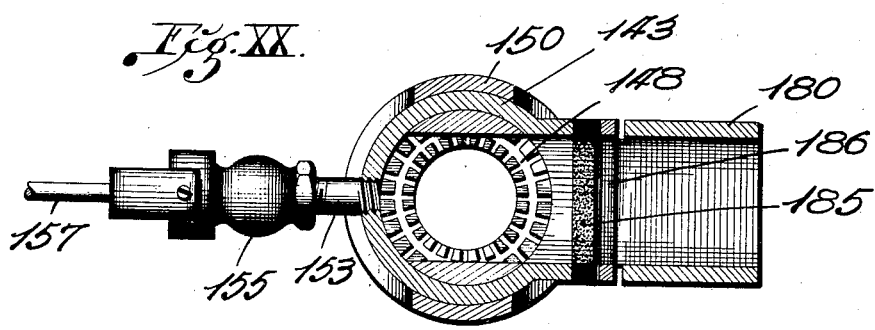
Fig. XX.
ATTEST.
E. M. Harrington
J. H. Cook
INVENTOR.
S. REINSBERG.
BY Geo. H. Knight ATTY.

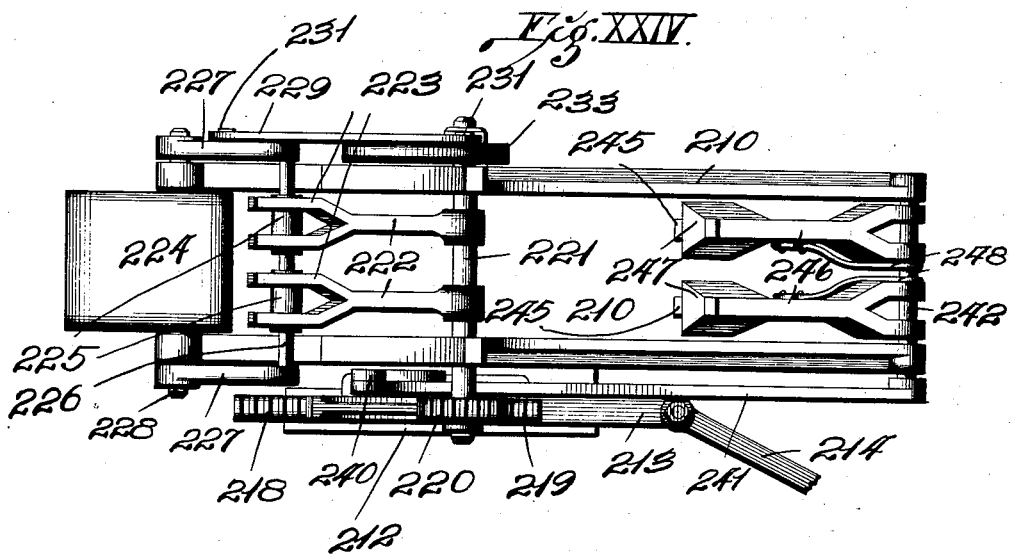
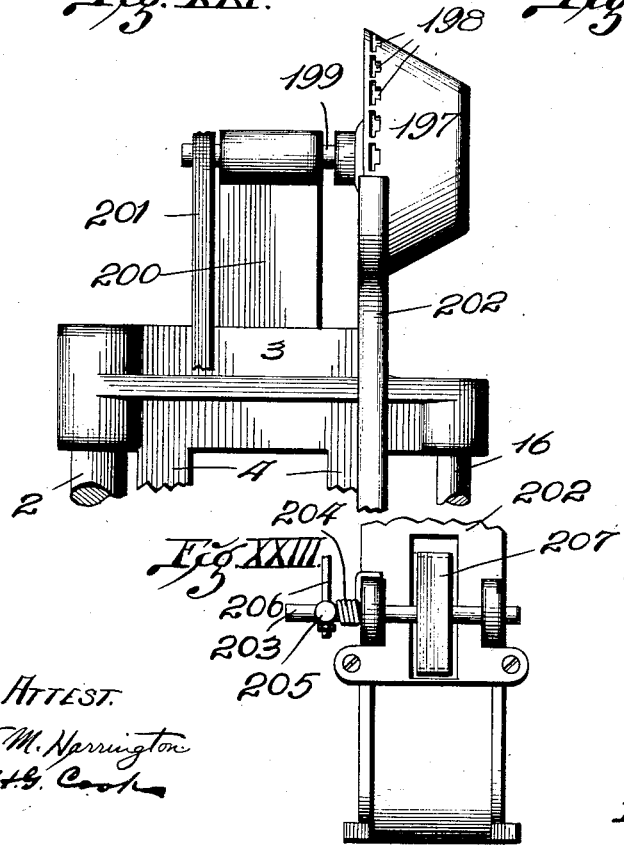
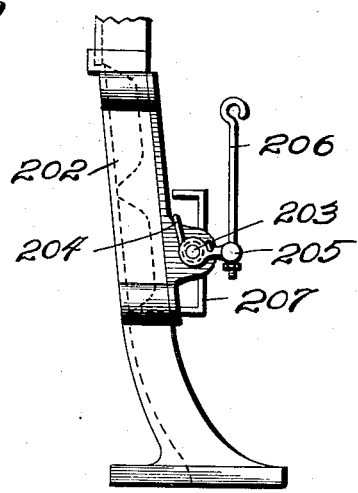

S. REINSBERG.
BOTTLING MACHINE.
APPLICATION FILED NOV. 21, 1908.
955,551.
Patented Apr. 19, 1910.
12 SHEETS—SHEET 11.
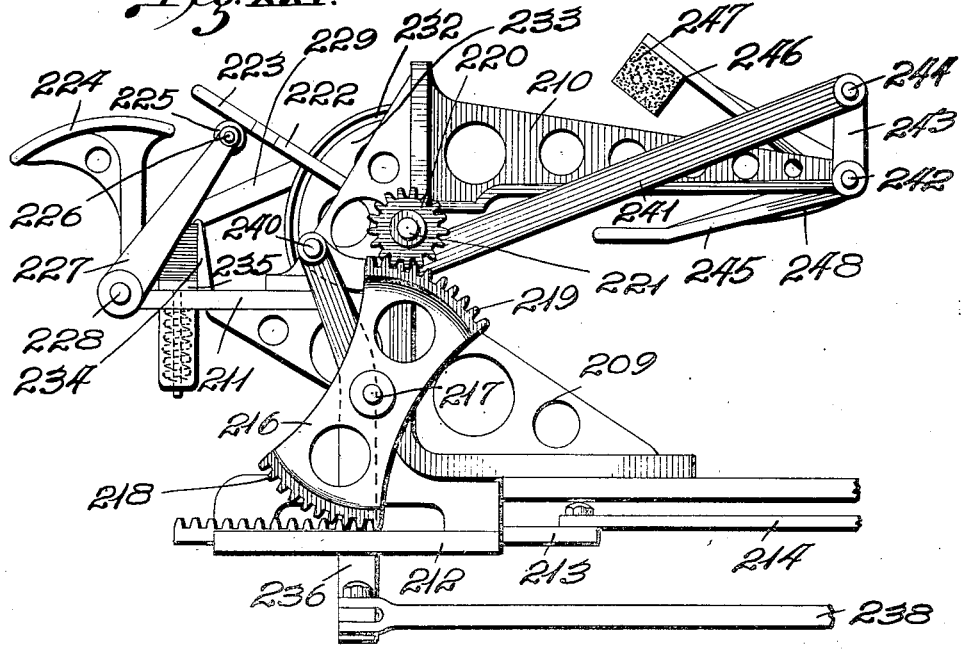
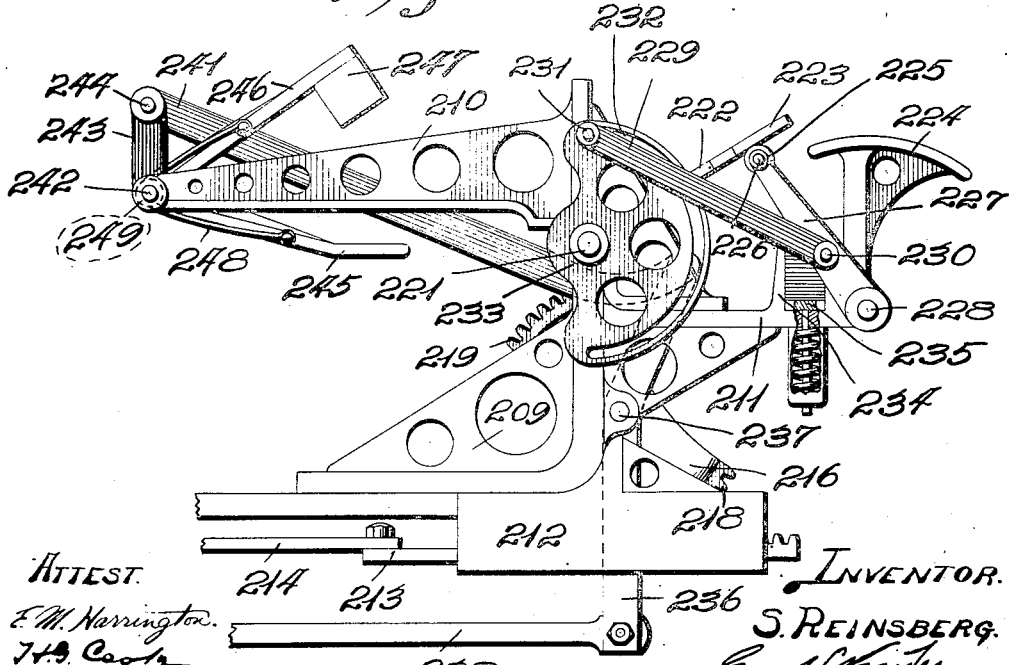

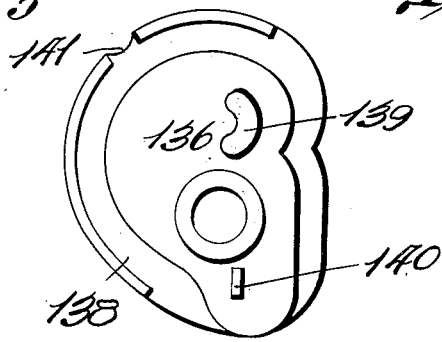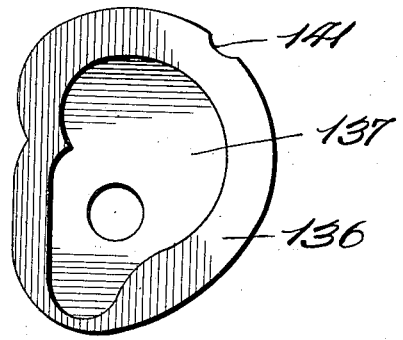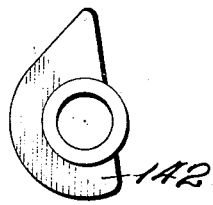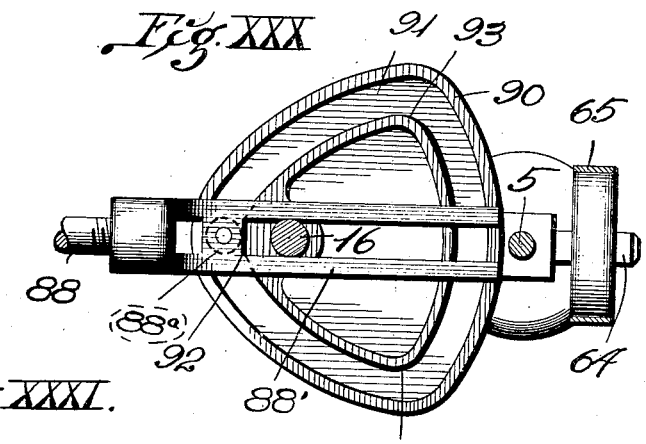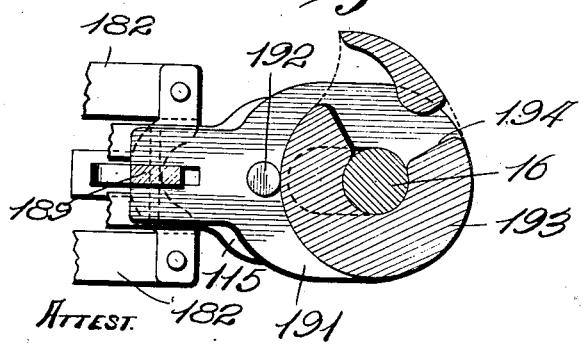

UNITED STATES PATENT OFFICE.

SIMON REINSBERG, OF QUINCY, ILLINOIS.

BOTTLING-MACHINE.

955,551.  Specification of Letters Patent.  Patented Apr. 19, 1910.

Application filed November 21, 1908. Serial No. 463,762.

*To all whom it may concern:*

Be it known that I, SIMON REINSBERG, a citizen of the United States of America, residing in Quincy, county of Adams, and State of Illinois, have invented certain new and useful Improvements in Bottling-Machines, of which the following is a full, clear, and exact description, reference being had to the accompanying drawings, forming part of this specification.

My invention relates to a machine in which provision is made for the several operations of washing, rinsing, heating, syruping, filling, crowning and labeling of bottles after they are introduced into the machine and before the removal thereof. By providing a machine in which all of the operations mentioned are carried out without the bottles being handled at any time during the operations, I make it possible to carry on all of the actions necessary with a minimum expenditure of labor and time.

Figure I is a top or plan view of my machine. Fig. II is a front elevation of the machine. Fig. III is a rear elevation of the machine. Fig. IV is an enlarged elevation of the mechanism for operating and controlling the turn-table of the machine. Fig. V is a top or plan view of the parts shown in Fig. IV. Fig. VI is a vertical section taken on line VI—VI, Fig. V. Fig. VII is an end view of the latch by which movement of the turn-table is controlled. Fig. VIII is an enlarged top or plan view of a fragment of the turn-table, one of the bottle carriers located at the starting or exchange station of the machine, and other parts of the machine at said station. Fig. IX is a vertical section on line IX—IX, Fig. VIII. Fig. X is an elevation of the parts by which the bottle carriers are operated at the exchange station. Fig. XI is in part an enlarged side elevation, and in part a longitudinal section of the washing mechanism. Fig. XII is a vertical cross section taken on line XII—XII, Fig. XI. Fig. XIII is in part an enlarged elevation, and in part a longitudinal section of the water delivery head of the washing mechanism. Fig. XIV is an enlarged cross section through the water delivery head of the washing mechanism. Fig. XV is an enlarged view of one of the washing brushes. Fig. XVI is an enlarged view partly in elevation and partly in longitudinal section of the rinser or steamer. Fig. XVII is an enlarged vertical section of one of the syrup cups and the valves associated therewith. Fig. XVII$^A$ is a top view of the syrup cup supporting bracket. Fig. XVII$^B$ is an elevation of one of the syrup cups. Fig. XVIII is an enlarged view partly in elevation and partly in vertical section of the filling and crowning mechanism. Fig. XIX is an enlarged vertical section through the filling and crowning mechanism. Fig. XX is a cross section taken on line XX—XX, Fig. XIX with the crown cap carrier omitted. Fig. XXI is an enlarged elevation of the crown cap delivery drum and the cap conducting chute. Fig. XXII is an enlarged side elevation of the lower portion of the crown cap conducting chute and the feed regulator that controls the passage of crown caps through said chute. Fig. XXIII is a front elevation of the parts shown in Fig. XXII. Fig. XXIV is a top or plan view of the labeling mechanism. Fig. XXV is an enlarged side elevation of the labeling mechanism. Fig. XXVI is an elevation of the labeling mechanism viewed at the side opposite that shown in Fig. XXV. Fig. XXVII is a face view of the floating head lifting cam. Fig. XXVIII is a face view of the reverse side of the cam shown in Fig. XXVII. Fig. XXIX is an elevation of the floating head depressing cam. Fig. XXX is a plan or top view of the cam that actuates the washing mechanism. Fig. XXXI is a horizontal section taken on line 31, 31—. Fig. XVIII through the cam that operates the carrier of the crown cap delivery mechanism.

In referring to the accompanying drawings, I will first make mention of the fact that the bottles to be operated upon while in my machine are carried with intermittent movements from one station to another and brought to rest at each station. In Fig. I, I have indicated these stations by the reference letters $a$, $b$, $c$, $d$, $e$, $f$, $g$, and $h$. Of these stations $a$ is the starting or exchange station; $b$, the washing station; $c$, the rinsing station; $d$, the heating station at which the bottles are tempered; $e$, the syruping station; $f$, the filling and crowning station; $g$, the drying station at which the exterior of the bottles are dried previous to the application of the labels, and $h$, the labeling station.

*General construction.*—1 designates a main pillar that is located intermediate of the ends of my machine and is surmounted by a main column 2.

3 is a main head surmounting the main column and provided with hanger arms 4, see Figs. II and III, also Fig. XVIII.

5 and 6 are end pillars that serve in conjunction with the main pillar 1 as supports for the stationary bed 7 of the machine which in turn supports various elements of the machine as will hereinafter appear.

8 designates a turn table that is rotatably mounted upon the main column 2 and is adapted to turn in a horizontal plane when actuated intermittently by the means to be presently described. In the edge of the turn table are notches 9, see full lines Figs. I and IV and dotted lines Fig. V, that are adapted to receive turn table actuating and detaining members.

10 designates the main horizontal drive shaft upon which is mounted a tight pulley 11 and a loose pulley 12. There is also upon the main drive shaft a tight pulley 13 that serves to impart power to a shaft to be hereinafter more particularly mentioned.

14 is a worm upon the main drive shaft and 15 is a worm wheel arranged in mesh with said worm. The worm wheel 15 is fixed to a transmission shaft 16 that is journaled in the bed 7 and is arranged parallel to the main column 2. The upper end of the transmission shaft 16 is journaled in the main head 3.

17 is a tappet fixed to the transmission shaft 16 and adapted to rotate therewith during the rotation of the main drive shaft, whereby a stud 18 carried by the tappet at its free end is carried at intervals into the notches 9 in the turn table 8 for the purpose of actuating said turn table. The turn table is held from movement when not actuated by the tappet 17 by a detent which comprises the following parts:

19 is a frame (see Figs. IV to VII inclusive) mounted upon the bed 7 adjacent to the main drive shaft and the transmission shaft and provided with upwardly projecting bearing ears 20 that receive a rockable latch rod 21 which is provided at one end with a trip arm 22 located in the path of travel of the tappet 17 and adapted to be engaged by the said tappet immediately before the stud 18 of the tappet enters into engagement with the turn table 8. Fixed to the latch rod 21 at its end opposite that provided with the trip arm 22 is a fork arm 23 that has mounted in it a transverse pin 24, see Fig. VI operable in a vertical slot 25 in a hollow post 26 extending upwardly from the frame 19. The transverse pin 24 has fixed to it a vertical detent stem 27 in the upper end of which is journaled a detent roller 28 that is adapted to enter into either of the notches 9 in the turn table after the actuation of said turn table by the tappet 17 and to remain in said notch until the turn table is to be again actuated by said tappet. Beneath the detent stem 27 is a lift spring 29. Each time the tappet arm 17 strikes the trip arm 22 of the latch rod 21, the fork arm 23 carried by said rod is moved downwardly with the result of imparting a similar movement to the transverse pin 24 and detent stem 27, whereby the detent roller carried by said stem is withdrawn from the notch in the turn table it previously occupied and then immediately after the tappet has become disengaged from the trip arm of the latch rod the lift spring 29 acts to elevate the detent stem 27, whereby the detent roller is returned to engagement with the turn table and is ready to enter the next succeeding notch therein when the partial rotation of the turn table has been accomplished by the tappet 17.

30 designates a main track rail that extends in a partial circuit around the turn table of the machine and which is adapted to direct the movement of the bottle carriers in their passage from station to station. This rail is so shaped as to provide for the bottles being so conducted as to occupy horizontal positions at certain of the stations to which they are moved, downwardly inclined positions at other stations, and to be elevated by the rail in upright positions previous to their being filled. It may be well to here state that the main track rail extends in a horizontal plane from and including the drying station $g$ to and including the labeling station $h$ and from the last named station to the starting or exchange station, and also to the scrubbing station. The track then descends from the scrubbing station to the rinsing station $c$ and descends in a lower plane to the heating station $d$ after which it again ascends to the syruping station $e$ at which point the bottle carriers are elevated into upright positions to remain in such positions, while the syrup is being introduced into the bottles and while the bottles are being transferred to and from the filling and crowning station. The main track is discontinued between the syruping station $e$ and the drying station $g$.

Referring now to the construction of parts at the start or exchange station $a$ of the machine and which are shown most clearly in Figs. VIII to X inclusive: 31 designates a short cam rail that is supported by posts 32 mounted on the bed 7 and located beneath the path of travel of the bottle carriers, during their guidance upon the main track rail 30. 33 is a second short cam rail arranged parallel to the cam rail 31 and at the rear thereof. The cam rail 33 is supported by posts 34. 35 is a short guard rail supported by posts 36 that are mounted upon a ledge 37 projecting from the bed 7. The guard rails are provided with flanges which extend inwardly above the main track rail 30, see Fig. IX, and which serve to restrain the bottle carriers from upward movement while they are located at the station $a$. 38 is a gage bar supported by posts 39 mounted upon the ledge 37 and adapted to receive the mouth ends of the bottles, when they are placed in the carriers at the station $a$.

*The bottle carriers.*—40 designates bottle carrier frames that are provided with pockets or cavities in which the bottles X are laid preferably in pairs. There are a number of these bottle carriers corresponding to the number of the station at which the carriers are to be stopped during the operation of the machine and each carrier frame is hinged at 41 to a hinge plate 42 carried by the turn table 8, thus providing for the carriers being moved into horizontal positions, so that the guide rollers 43 located at the outer ends of the carrier frames may ride upon the track rail 30 and also for the carrier frames being elevated into upright positions above the turn table. When the carrier frames are in upright positions their rear ends rest upon the hinge plates 42, and in the seating of the frames upon said hinge plates, cushioning action of the frames is afforded by buffer springs 44. As each bottle carrier approaches the starting or exchange station $a$, its guide roller 43 passes beneath the guard rail 35, and the carrier is retained in a horizontal position, due to the presence of said guard rail, notwithstanding the occurrence of a lifting action beneath the carrier frame on the actuation of parts to be presently described.

45 designates a bottle clamping rod that is vertically positioned in each carrier frame, the rod being loosely positioned in the frame, in order that it may move vertically therein between the pair of pulley receiving pockets in the carrier frame. At the upper end of the clamping rod is a head 46 that has secured to it clamping arms 47 which project laterally upon the head and are adapted to extend over the bottles when they are laid in the carriage. In the lower end of the clamping rod is mounted an anti-friction wheel 48 that is adapted to ride onto the cam rail 31 when the bottle carrier is conducted to the station $a$ and by so doing acts to elevate the clamping rod, its head, and the clamping arms 47, during which action the retracting spring 49 surrounding the clamping rod is compressed to the necessary degree to permit the ascent of the clamping rod. After the clamping rod has been elevated in the manner stated, the carrier is brought to rest at the station $a$, due to cessation of operation of the turn table 8, and the carrier is in condition to receive the bottles to be washed, and also for the previous removal of bottles from the carrier if the carrier is occupied by bottles which have been filled and labeled. The bottles are then laid upon the carrier frame to rest in its pockets and with their mouth ends opposing the gage bar 38.

It is essential for the practical operation of my machine that the bottles placed in the various carriers be mounted therein in such manner that the mouth ends of the bottles will project beyond the outer ends of the carriers to a like degree, so that the bottles will all receive the parts that are to engage the mouth ends with a similar and positive action. To provide for the accurate mounting of the bottles in the carriers, I therefore employ in each carrier an adjusting block 50 that is located at the rear end of the carrier frame and is adapted to move vertically in engagement with the bottom of the bottle in front of it. The adjusting blocks are of wedge-shape, and they are provided with legs 51 that extend outwardly through the carrier frames, each leg having fitted thereto an anti-friction wheel 52 that is adapted to ride onto the short cam rail 33 that is located adjacent to the cam rail 31. To prevent breakage of the bottles when they are subjected to pressure, the adjusting blocks 50 are provided with cushions of rubber or other yielding material against which the bottoms of the bottles may rest.

During the operation of my machine, each carrier is brought in turn to the starting or exchange station $a$ and the anti-friction wheel 48 of the clamping rod 45 rides onto the cam rail 31 thereby elevating said clamping rod to permit the introduction or removal of bottles. Immediately after the anti-friction wheel 48 has moved onto the cam rail 31 to release the bottles, the wheel 52 associates with the adjusting blocks with the result of causing said blocks to be elevated and remain in an elevated position, while the bottle carrier is located at the station $a$. Then, when movement is again imparted to the turn table to conduct the carrier previously at station $a$ to station $b$, the anti-friction wheels 52 travel off of the cam rail 33 before the anti-friction roller 48 leaves the cam rail 31. The separation of the wheels of the adjusting blocks from their cam rails before the separation of the wheel of the clamping rod is rendered possible by reason of the cam rail 33 being of less length than the cam rail 31 as seen in Fig. X. As the wheels 52 move off of the cam rail 33, the adjusting blocks 50 descend and during their descent they act upon the bottles loosely mounted in the carrier at this time to carry the mouth ends of said bottles to the gage bar 38. Immediately after the adjustment of the bottles has been accomplished, the anti-friction wheel 48 carried by the bottle clamping rod moves off of the cam rail 31 and said clamping rod is moved downwardly by the spring 49, whereby the clamping fingers 47 are drawn tightly into engagement with the bottles in the carrier to hold them from movement in the carrier, while the various operations to be hereafter described are being carried on until the bottles have been again brought to station *a*.

*The washing mechanism.*—53 designates posts surmounting the bed 7 of the machine at the washing station *b*.

54 are hollow centering heads reciprocally mounted in the posts 53 and which are provided at their forward ends with funnel-shaped mouths adapted to receive the necks of the bottles conducted by the carriers to the washing station. The centering heads are surrounded by expansion springs 55 that act to move said heads forwardly when they are free of restraint to permit such movement. Upon each centering head is a collar 56 preferably adjustably secured to the head and which is adapted to be engaged by means to be hereinafter set forth, whereby the centering heads are retracted to permit the bottles to pass into a position in front of the heads.

57 are water conducting pipes that extend into the centering heads 54 and to which are attached the rods 58 of the brushes 59, see Figs. XI and XV. The brush rods are of tubular form and they are provided with perforations, as seen at 60, Fig. XV, in order that water delivered into said rods from the water conducting pipes 57 may escape from the brush rod and enter the bottles into which the brushes are introduced. Rotary movement is imparted to the water conducting pipes 57 and the brushes by pulleys 61 fixed to sleeves 62 surrounding the water conducting pipes, and which are in turn flanged to said pipes. Power is communicated to the pulleys 61 by a belt 63, see Figs. II, III, XI and XIII, and which operates upon the pulley fixed to a shaft 64 extending longitudinally of the machine. The shaft 64 is driven by a belt 65 that is operable upon a pulley on said shaft, and also upon the pulley 13 on the main drive shaft 10.

66 is a T-head located at the rear end of the water conducting pipes 57 and to which said water conducting pipes are attached by connecting pipes 57' that are mounted in stuffing boxes 67 fitted to the T-head, as seen in Fig. XIV. The T-head 66 serves as a delivery member for the flow of water to the brush operating conducting pipes 57, and within the head of said T-head is an inlet duct 68 and branch ducts 69, the latter of which lead to the connecting pipes 57', see Figs. XIII and XIV. Water is delivered to the T-head through a supply valve 70 mounted upon the T-head at the location of the inlet duct 68 and to which a pipe 71 leading from any suitable source of water supply is attached. The water supply valve is provided with a stem 72 that is surrounded by a spring 73 which serves to move said stem outwardly with the result of permitting the flow of water through the valve to the T-head 66 and therefrom to the brushes 59, after said brushes have been moved into the bottles to be washed in a manner to be hereinafter set forth.

74 is a tappet of bell crank shape, that is pivotally mounted in a bracket 75 carried by the T-head 66. This tappet has an upwardly extending arm that opposes the valve stem 72 and is adapted to engage said stem, and it also has a rearwardly extending arm in which is mounted an anti-friction roller 76.

77 designates a stationary guide rod, the forward end of which is mounted in a suitable support located between the posts 53 that support the centering heads 54. This guide rod extends rearwardly through a sleeve 78 fixed to the T-head 66 and adapted to reciprocate with said T-head upon said guide rod. Upon the guide rod near its rear end is an adjustable trip member 79 preferably in the form of a sleeve or collar having a tapered forward end and secured to the guide rod by a set screw 80.

81 is a shifter rod that extends loosely through the leg of the T-head 66 and a sleeve 82 carried by said leg.

83 is a shifter arm fixed to the shifter rod 81 and loosely fitted to the stationary guide rod 77 on which it is adapted to reciprocate. The shifter arm 83 is provided with forked arms that are adapted to straddle the centering heads and to engage the collars 56 on said centering heads, when the shaft rod 81 is moved rearwardly and whereby the centering heads are retracted to permit the bottles to be washed to pass into positions in front of said centering head. The shifter rod is adapted to be operated by the leg of the T-head and to provide for such operation, I mount upon the shifter rod a collar 84 that is adapted to be struck by the T-head when it is moved rearwardly to retract the water conducting pipes and the washing brushes carried thereby.

The T-head 66 and the parts associated with it and operable thereby are actuated by a lever 85 that has slot and pin connection at 86 with the leg of said T-head. The lever 85 as seen in Figs. II and III has its lower end pivotally connected at 87 to the base of the end pillar 6.

88 is a pitman rod pivoted at 89 to the lever 85 and extending into proximity with the lower end of the vertical transmission shaft 16. The pitman rod 88 is actuated by a cam 90 that is fixed to said transmission shaft and is illustrated in detail in Fig.

XXX. The pitman rod is provided with a fork 88' that straddles the transmission shaft 16 and at the lower side of which is a roller 88ᵃ, see dotted lines Fig. XXX. In the cam 90 and extending outwardly from the top thereof is a cam groove 91 in which the roller 88ᵃ is operable. The cam groove 91 has within it a corner 92 that is located at approximately the nearest point in the groove to the axis of the transmission shaft and corners 93 that are in lines divergent from the corner 92.

During the operation of the machine the cam 90 has rotative movement imparted to it by the transmission shaft 16 and it in turn serves to impart reciprocatory movement to the pitman rod 88. The pitman rod and cam are shown in the drawings in the positions assumed when the washing brushes are present in bottles being washed and are being rotated therein. At this time the roller 88ᵃ is located at the corner 92 in the cam groove. Then, as the cam rotates, one of the corners 93 in the cam is caused to approach the roller 88ᵃ, whereby the pitman rod 88 is moved longitudinally and acts to impart a backward movement to the lever 85. The lever 85, due to its connection with the T-head 66 acts to move said T-head rearwardly upon the stationary guide rod 77 whereby the water conducting pipes 57 and the brushes carried thereby are retracted from the brushes. As the T-head moves rearwardly, it carries with it the tappet 74 until the roller 77 of said tappet strikes against the trip member 79 on the stationary guide rod, whereby the tappet is swung upwardly and brought into engagement with the stem 72 of the water supply valve 70 to close said valve and stop the flow of water therethrough to the water conducting pipes 57 and the washing brushes. Immediately after the operations just stated have taken place, the leg of the T-head 66 strikes the collar 84 on the shifter rod 81, and the said shifter rod is, as a consequence, drawn backwardly with the result of causing the shifter arm 83 to retract the centering heads 54 in order that the bottles previously engaged thereby may be conveyed with the carrier in which they are mounted to the next station in the machine upon the partial rotation of the turn table 8. It should be here noted that there is an interval of approximate rest of the washing mechanism after the parts of said mechanism have been retracted in the manner explained, in order that the turn table may operate before the parts of the washing mechanism return to their forward positions. This rest is permitted due to the shape of the cam groove between the corners 93. As the roller 88ᵃ of the pitman rod moves from the second encountered corner 93 of the cam corner to return to the corner 92 of said groove, the pitman rod is moved in a forward direction with the result of its exerting a pull upon the lever 85 and said lever by acting upon the T-head 66 causes said T-head to move forwardly toward the turn table and carry with it the water conducting pipes and washing brushes, so that said brushes will enter into the bottles that have been just previously advanced into positions in front of the centering heads and are engaged by said heads immediately upon the commencement of the forward movement of the T-head. At the beginning of the forward movement of the T-head, the tappet 74 becomes freed from the trip member 79 and is therefore permitted to move away from the stem 72 of the supply valve 70, in order that flow of water through said valve to the water conducting pipes and washing brushes may take place.

*The rinsing mechanism.*—The rinsing mechanism is located at station c, and the bottle carriers move downwardly to an incline, due to the depression in the main track 30 at this point, in order that the water remaining in the bottles after they are washed and to be introduced thereinto for the purpose of rinsing, may escape from the bottles. The rinsing appliance which is shown in detail in Fig. XVI is supported by a bracket arm 94 and comprises the following parts:

95 designates a frame secured to the bracket arm and having guide posts 96 in which reciprocatory guide rods 97 are operable.

98 is a T-head similar in construction to the T-head 66 and to which water is delivered through a pipe 99. The T-head 98 has secured to it at the location of the water ducts therein, water conducting pipes 100 that are arranged at an angle corresponding to that occupied by the bottles when they are located at the rinsing station.

101 are water chests secured to the forward ends of the water conducting pipes 100 and in the forward ends of which are loosely fitted discharge tubes 102. These water tubes are adapted to move inwardly and outwardly in the water chests, and they are provided near their rear ends with ports 103 that are adapted to provide communication between the water chests and the tubes when the tubes are moved inwardly. At the outer end of each tube is a pilot point 104 that contains outlet orifices 105.

106 are presser disks surrounding and fixed to the water discharge tubes and provided with apertures 107. Within the water chests 101 are valves 108 that are adapted to seat against the front ends of the chests around the water discharge tubes. These valves are fixed to said tubes and are backed by springs 109.

110 (see Figs. III and XVI) is a lever pivotally connected to the T-head 98 of the rinsing appliance and pivoted at 111 to the main pillar of the machine. This lever has connected to it a pull cord 112 that extends through a pulley block 113 and is attached to the pitman rod 88 at 114. When said pitman rod is operated in the direction to impart a pull upon the cord 112 after the bottles to be rinsed have been brought to the rinsing station $c$, the lever 110 is moved upwardly and imparts a forward movement to the T-head 98, whereby the guide rods 97, the water chests 101 and other parts associated with the T-head are also moved forwardly. The pilot point at the forward ends of the water discharge tubes 102 then enter into the bottles to be rinsed and the presser disks 106, by engagement with the mouth ends of the bottles, act to move the water discharge tubes rearwardly against the action of the springs 109, so that the valves 108 are unseated and the ports 103 in the discharge tubes are moved into the water chests. Water may then flow from said water chests into said discharge tubes and therefrom into the bottles to rinse them, the air and water being discharged from the bottles during the rinsing operation through the apertures 107 in the presser disks 106. The rinsing operation is continued for a period corresponding to the washing operation at the station $b$ and is discontinued when the washing operation has been completed and the turn table of the machine is to be actuated to advance the bottle carriers, at which time the rinsing appliance returns to its normal position.

*The heating mechanism.*—This mechanism corresponds in construction and operation to the rinsing mechanism and therefore a description of such rinsing mechanism may apply to the heating mechanism used at the station $d$, the only essential difference being that steam or other heating fluid is introduced through the mechanism at the drying station and into the bottles to heat them interiorly in order that they will be tempered before they reach the next succeeding stations $e$ and $f$, the tempering of the bottles being provided for to prevent breakage of the bottles when hot liquid is introduced into them. The heating mechanism is operated by a lever 110' connected to the pitman rod 88 by a cord 112.

*The syruping mechanism.*—This mechanism is supported by the same means as that which supports the filling and crowning mechanism, and is illustrated in Figs. I, III and XVII, the last named view being one showing one of the syrup cups and the parts associated with it in detail. It should be noted at this point that the main track 30 surrounding the turn table of the machine extends upwardly adjacent to the syruping station and that due to the track being so shaped at this point, the anti-friction rollers 43 of the bottle carrier frames 40 are directed upwardly with the consequence of causing the carriers and bottles to be raised into upright positions above the turn table.

115 designates a floating head that is loosely fitted to the main column 2 and the vertical transmission shaft 16 and is adapted to be moved vertically upon these members by means to be hereinafter described.

116 (see Figs. III and XVII) are syrup cups.

$110^a$ is a bracket that is suitably secured to the floating head 115 and which is provided with two arms $116^b$ containing vertical guide holes $116^c$, see Fig. XVII$^A$.

$116^d$ is a horizontal bar suitably secured to the syrup cups 116 and is provided with downwardly extending guide stems $116^e$ that are slidably fitted in the holes in the bracket arms $116^b$. By this construction the syrup cups are so supported as to provide for their moving downwardly with the floating head 115 to the bottles moved into positions beneath them, and when the members associated with said syrup cups arranged for contact with the bottles come into contact with the bottles, the syrup cups are permitted to move upwardly to prevent crushing of the bottles during continued descent of the floating head 115 for a purpose to hereinafter appear. The syrup cups are provided at their lower ends with necks 117 and with inlet ducts 118. Within each syrup cup is a diaphragm that is adjustable for the purpose of regulating the size of the syrup receiving cavity in the cup beneath said diaphragm. Each diaphragm has connected to it an adjusting stem 120 that extends to the exterior of the cup and is provided at its upper end with a knob 121 by which the stem may be turned to adjust the diaphragm, as may be desired. Each syrup cup has attached to it at the location of its inlet duct 118 a valve housing 122, to the upper end of which is connected a syrup delivery pipe 123. 124 is a valve in the housing 122 that is adapted to be elevated to cut off the delivery of syrup from the syrup supply pipe. The valve 124 is carried by a stem 125 that extends downwardly from the valve housing and is surrounded by an expansion spring 126.

127 are syrup discharge tubes loosely fitted in the necks 117 of the syrup cups, and the upper ends of which are closed. In the walls of the syrup discharge tubes near their upper ends are ports 128 that are adapted to provide communication between the interiors of the cups and said tubes when the tubes are moved upwardly in the necks 117. At the lower end of each syrup discharge tube is pilot point 129 that contains outlet orifices 130 through which the syrup may escape into the bottles arranged beneath the syrup cups. 131 are lift arms fixed to the syrup discharge tubes 127 upon which the lower ends of the valve stems 125 rest. 132 is a presser collar located upon each syrup discharge tube beneath the lift arms thereon.

Immediately after the bottles into which the syrup is to be introduced have reached the syruping station, the floating head 115 is caused to descend by actuation of parts as will hereinafter more fully appear, and the syrup cups are lowered a sufficient distance to cause the presser collars 132 to bear against the necks of the bottles and elevate the syrup discharging tubes 127. As said tubes ascend, they carry with them the lift arms 131, whereby the valve stems 125 are elevated and the valves 124 are seated to cut off the flow of syrup into the syrup cups. At the same time that the valves just mentioned are seated, the orifices 128 in the syrup discharging tubes are placed in communication with the measuring chambers in the syrup cups and the syrup in said chambers flows therefrom through the tubes and into the bottles arranged beneath the tubes. When the floating head 115 again ascends, it carries with it the syrup cups and the discharging tubes and valves 124 are returned to their normal positions under the influence of the spring 126, thereby closing the outlets from the syrup cups and opening the inlets thereinto, in order that the measuring chambers of the cups may be again filled with syrup to be emptied into the bottles next conducted to the syruping station.

*The filling and crowning mechanism.*—This mechanism which is located at station *f* includes the floating head 115 and is illustrated in Figs. I to III inclusive, Figs. XVIII to XX inclusive, and Figs. XXVII to XXIX inclusive. The floating head 115 is raised and lowered by means operated by the vertical transmission shaft 16, comprising the following elements:

133 is a horizontal shaft journaled in the hanger legs 4 of the main top head 3 of the machine. This shaft is driven by bevel gear wheels 134 and 135 fixed respectively to the transmission shaft and shaft 133 and arranged in mesh with each other.

136 is a lifting cam fixed to the shaft 133. This cam which is illustrated in detail in Figs. XXVII and XXVIII is provided at one side with a face cam-way 137 that is adapted to receive an anti-friction roller 115' carried by the floating head 115, thereby providing for said floating head being elevated during the rotation of the cam. 142 is a depressing cam also fixed to the horizontal shaft 133 and the periphery of which is arranged in engagement with an anti-friction roller 115ª carried by the floating head 115. The depressing cam operates to move the floating head downwardly, with a positive action after it has been elevated by the lifting cam 136.

143 designates a hollow crowning head provided with a neck 144 that extends upwardly from the body of the head and is loosely positioned in a guide pocket 145 in the floating head 115, see Fig. XIX.

146 is a cushion spring located in the guide pocket 145 above the neck of the crowning head and which serves to yieldingly resist the upward movement of said crowning head. Within the crowning head and at its upper end is a former ring 147 having utility to be hereinafter mentioned, and beneath said former ring is a slotted induction ring 148 which is sufficiently separated from the former ring to permit the operation of a member to be hereinafter described between these parts. Beneath the induction ring is a packing ring 149 of pliable material, such as rubber, and through which the necks of the bottles to be filled and crowned are adapted to pass, in order that they may be confined within the packing ring, which serves to produce a liquid-tight joint around the necks of the bottles. The packing ring 149 is adapted to be compressed, so that it fits snugly to the necks of the bottles through the medium of a compressor 150 that has slot and pin connection at 151, see Fig. XVIII, with the neck of the crowning head, and is provided at its lower end with an inwardly extending flange 152, see Fig. XIX which extends beneath the packing ring. The compressor is adapted to be moved upwardly for action upon the packing ring, by means to be hereinafter set forth. The liquid with which the bottles are to be filled is delivered into the crowning heads through inlet pipes 153 that have communication with the induction rings 148 and passes from said induction rings to the spaces within the crowning heads and therefrom into the bottles. The entrance of liquid into the inlet pipes 153 from the supply pipes 154 takes place through supply valve housings 155 interposed between the supply pipes and the inlet pipes. In these valve housings are valves 156 that are carried by rods 157 which are normally so held by springs 158 as to hold the valves to their seats and prevent flow of liquid into the crowning heads. Each crowning head is provided at its upper end with a vent duct 159 and attached to each crowning head at the location of the duct in the former ring is a snifting valve that comprises a tube 160 provided with one or more air vents 161, see Fig. XIX.

162 is a valve operable in the tube 160 and carried by a valve rod 163 that is adapted to be moved outwardly by a retracting spring 164 for the purpose of moving the valve 162 in an outward direction and to a seat within the tube 160 to close the passage-way through said tube from the interior of the crowning head to the air vents of said tube.

165, see Fig. XVIII, designates a valve actuating lever that is pivoted at 166 to the floating head 115. This lever has an arm extending downwardly to the valve rods 157 and 163 and an arm projecting toward the lifting cam 136, the last named arm having fitted to it an anti-friction roller 167 that is located beneath the lifting cam and is adapted to be actuated thereby, for the purpose of imparting an outward movement to the downwardly extending arm of the lever when it is actuated by the periphery of said cam riding in engagement with the anti-friction roller. The liquid supply valve rod 157 is fixed to the lower arm of the lever 165, in order that when said arm is thrown outwardly, said valve rod will be moved and carry the valve 156 away from its seat to permit flow of liquid to the bottles to be filled and the snifting valve rod 163 is loosely fitted to the lower arm of said lever.

168 is a lever pivoted at 169 to the neck of the crowning head 143 having pivotal connection at 170 with the compressor 150 surrounding the crowning head, whereby when said lever is actuated, the compressor is elevated with the result of causing it to compress the packing ring 149 around the neck of the bottle inserted into the corresponding crowning head. The lever 168 has mounted in it at a point diametrially opposite its pivotal point an anti-friction roller 171 which serves to actuate certain members to be hereinafter described. The lever 168 is united by a connecting rod 172 to a bell crank lever 173 that is pivoted at 174 to a post 175 carried by the floating head 115. One of the arms of the bell crank lever just referred to extends horizontally in a direction toward the lifting cam 136 and this arm has fitted to it an anti-friction roller 176 that is adapted to be engaged by a boss 139 projecting from the opposing face of the lifting cam and whereby the bell crank lever 173 is actuated to cause it to operate the lever 169.

177 is a locking dog pivotally mounted adjacent to the bell crank lever 173 and provided with a lift 178 that is adapted to engage the horizontal or upper arm of the bell crank lever for the purpose of holding said bell crank lever from movement after it has been engaged by the boss 139 on the lifting cam to actuate the lever 168, in order that the last named lever will be held for an interval of time while performing its function. The locking dog 177 is backed by a spring 179 that tends to carry the dog into bell crank lever locking position and said dog is adapted to be moved rearwardly against the action of said spring by a trip lug 140 projecting from the face of the lifting cam in order that the locking dog may be moved at the proper moment to free the bell crank lever 173.

At the side of each crowning head opposite to that at which the corresponding liquid delivery members are located is a ledge 180 that serves as a support and guide for a slidable feeder 182 to which the crowning caps that are to be applied to the bottles are delivered, to be carried into the crowning head. In the top of the ledge 180 is a pocket 181 into which the crowning caps are delivered, and in the feeder 182 is an opening 183 adapted to register with said pocket when the feeder is drawn outwardly. At the location of said opening in the feeder are spring controlled dogs 184, see Fig. XIX onto which the crowning caps are delivered from the pocket 181 to be conducted into the crowning head. To provide against the leakage of liquid through the crowning head around the feeder 182 the said feeder extends through a packing member 185 which is located against the exterior surface of the crowning head above the ledge 180. This packing member, which may be of rubber or other suitable material, is pressed tightly against the crowning head and around the feeder by a presser bar 186 through the lower end of which the feeder extends and which is pivoted to the crowning head at 187. The upper end of the presser bar is provided with a cam face 188 that is adapted to receive the anti-friction roller 171 carried by the lever 168.

It will be readily understood that when the anti-friction roller just mentioned is moved upwardly upon the actuation of the lever by which it is carried, it will, by riding against the cam face of the presser lever, cause said lever to compress the packing member 185 and produce a liquid tight joint around the crown cap feeder at the crowning head.

The crown cap feeder 182 is operated by a throw lever 189 that is suspended from a point of pivotal connection at 190 to one of the hanger legs 4 of the main top head 3 and the lower end of which is loosely fitted to said feeder. The throw lever is pivotally connected to a reciprocatory bar 191 through which the vertical transmission shaft 16 extends and which is slotted, as seen in Fig. XXXI, to permit forward and backward movement of said bar. Upon the reciprocatory bar 191 is an anti-friction roller 192 that is arranged to be engaged by a cam 193 fixed to the vertical transmission shaft and which is provided with a cam-way 194 through which said roller is adapted to travel in order that the roller may at one time approach the axis of the cam and then pass to the periphery of the cam for the purpose of imparting the desired reciprocatory movement to the throw lever actuating bar 191.

Within the neck of each crowning head is a yieldable resistance block 195 that is normally pressed downwardly by a spring 196. This resistance block is adapted to bear against the crowning caps when they are elevated in the crowning ring 147, thereby preventing upward movement of the caps while their edges are being bent inwardly into engagement with the beads at the mouths of the bottles due to pressure thereagainst by the former ring 147.

During the operation of the machine, the parts of the filling and crowning mechanism are actuated in the following manner: During the rotation of the cam shaft 133 the depressing cam 142 acts to depress the floating head 115 with the result of lowering the crowning heads 143 to the bottles that have been moved to the filling and crowning station and the necks of said bottles enter into the crowning heads in order that the liquid which is to be delivered thereinto may enter the bottles. The lifting cam 136 then rotates sufficiently to cause the boss 139 carried thereby to engage the anti-friction roller 176 of the bell crank lever 173 whereby said lever is moved to actuate the lever 168 with the result of causing said lever to impart an upward movement to the compressor 150 whereby the packing ring 149 is compressed around the necks of the bottles. At the same time the lever 168, through the medium of the anti-friction roller 171, operates upon the presser bar 186 which acts to compress the packing members 185 around the crown cap feeders 182. When the lever 168 has been moved to perform the offices stated, it is temporarily held from movement due to the engagement of the locking dog 177 with the bell crank lever 173. Then, upon the continued rotation of the lifting cam, the valve actuating lever 165 is actuated, due to the pressure of said cam against the anti-friction roller 167 of said lever, and the lower arm of the lever is moved outwardly to impart a movement in a corresponding direction to the liquid controlling valve stems 157, whereby the valves 156 are unseated in order that liquid may flow through the valve housings 155 and inlet pipes 153 and the induction rings 148 and therefrom to the bottles to be filled. Just previous to the bottles being filled, the anti-friction roller 167 of the valve actuating lever 165 enters into a notch 141 in the lifting cam, see Figs. XXVII and XXVIII, and the lower arm of said lever moves inwardly to act upon the valve stems 157 and the rods 163 of the snifting valves 162, whereby the controlling valves 156 are temporarily seated and said snifting valves are temporarily unseated in order that the air in the crowning heads may find escape therefrom to permit of the bottles being completely filled. Immediately thereafter, the anti-friction roller 167 moves out of the notch in the lifting cam, the snifting valves return to their seats, and the controlling valves are again opened for renewed flow of liquid to the crowning head. The bottles having been filled, the downward movement of the floating head is increased under the action of the depressing cam 142, with the result of causing the mouth ends of the bottles to pass between the crown cap supporting dogs 184, in order that said crown caps may become seated upon said mouth ends. The former rings 147 then exert pressure against the edges of the crowning caps to crimp such edges onto the neck beads of the bottles. The crowning operation being thus completed, the floating head is elevated by the lifting cam 136, thereby separating the crowning heads from the bottles. Just previous to such separation, however, the locking dog 177 is released from the bell crank lever 173 by the lug 140 of the lifting cam, thus permitting the release of the lever 168 in order that pressure by the presser bar 186 upon the packing member 185 may be relieved, and the compressors 150 may move downwardly to relieve the pressure previously exerted by it upon the packing ring 149.

The crowning caps to be applied to the bottles are placed in a funnel-shaped rotatable hopper 197 that is carried by a shaft 199 journaled in a post 200. The shaft 199 is provided with a pulley on which operates a belt 201, see Figs. II, III and XXI, that is driven by the cam shaft 133. The crowning cap hopper is provided with a plurality of discharge openings 198 that are widened at their sides nearest the widest end of the hopper and through which the crowning caps escape.

202 is a feed chute beneath the crowning cap hopper and into the upper end of which the caps enter. The discharge openings 198 in the hopper 197 are shaped as stated to provide for the crowning caps being delivered from the hopper into the chute in a proper manner to cause all of them to be discharged from the chute, right side uppermost. The lower end of the feed chute, which is divided into two branches, terminates immediately above the slidable feeder 182, as seen in Fig. XIX, in order that the crowning caps may be delivered into the pockets 181 in said feeder. Each branch of the feeding chute has journaled to it a feed regulator shaft 203, rotatable in one direction by a controlling spring 204, see Figs. XXII and XXIII, and rotatable in the opposite direction by an arm 205 and a pull rod 206 fixed to said arm. The pull rod is adapted to be connected to the machine at any desirable point whereby the shaft 203 is actuated at intervals through the medium of said pull rod.

207 is a double armed detent fixed to the shaft 203 and the arms of which are adapted to enter an opening 202' in the feed chute to engage the crowning caps as they descend in the chute, in order that said crowning caps will fall singly into the pocket in the feeder 182 that is to receive them.

*The labeling mechanism.*—This mechanism is illustrated in Figs. I, II, XXIV, XXV and XXVI, and it is located at station *h* of the machine. The bottles to be labeled are, previous to their passage to the labeling station, lowered from upright positions to horizontal positions, due to the engagement of an anti-friction roller 40' (see especially Figs. II and IX,) that is carried by each bottle carrier frame 40 and which engages a cam rail 208, (see Fig. II,) located adjacent to the filling and crowning station of the machine. After the bottles have been filled and crowned, they are, upon the movement of the turn table of the machine, carried to the drying station *g* where they remain for an interval pending the next actuation of the turn table, in order that the exterior surfaces of the bottles may become dried before the labels are applied thereto.

209 designates brackets mounted upon the bed 7 of the machine and which serve as supports for inner bearer arms 210 that project over the turn table at the labeling station. These brackets also serve as supports for outer bearer arms 211.

212 is a runway member depending from one of the brackets 209 and in which is loosely seated a rack bar 213 capable of reciprocatory movement longitudinally of the labeling mechanism and toward and away from the turn table. The rack bar 213 is operated by a throw rod 214 that is pivoted to the rack bar, and is actuated by a cam 215 fixed to the main vertical transmission shaft 16. The rack bar 213 serves to impart a rocking motion to a double segment gear member 216 pivotally mounted at 217 above the rack bar and provided at its lower end with gear teeth 218 arranged in mesh with the rack bar. The double gear segment member is provided at its upper end with gear teeth 219 which mesh with the teeth of a pinion 220 fixed to a shaft 221 journaled in the inner bearer arms 210 and which extends transversely of the labeling mechanism.

222 are label carrying arms fixed to the shaft 221 and provided at their free ends with forks 223.

224 is a paste table that is stationarily supported by the bearer arms 211 and which is provided with a convex paste receiving top surface.

225 are paste rollers upon a shaft 226 which is supported by carrier arms 227 fixed to a shaft 228 journaled in the bearer arms 211. The arms 227 are moved upon their journals so that the paste rollers supported thereby are alternately carried in an outward direction across and in contact with the surface of the paste table 224 and then returned inwardly, whereby paste is gathered by the paste rollers from the paste table and is delivered therefrom at the proper time to the forks of the label carrying arms 222. Oscillating movement is imparted to the paste roller carrying arms by a connecting rod 229 pivoted at 230 to one of said arms and provided at its outward end with a stud 231 that is operable in a cam slot 232 in a cam 233 fixed to the shaft 221. The shaft just mentioned has a partial rotation only imparted to it through the medium of the double segment gear member 216, and the pinion 220 and as a consequence only a partial rotation is imparted to the cam 233, after which a reverse movement is imparted to said cam in order that the connecting rod 229 may be actuated in such manner as to impart the desired oscillating movement to the paste roller carrying arms 227.

234 is a label holder supported by the bearer arms 211 and provided with a spring-pressed plunger 235 by which the labels placed in the holder are elevated as the topmost labels are withdrawn from the pack placed in the holder. The manner of withdrawing these labels and transferring them to the bottles will be hereinafter set forth.

235 designates a lever pivoted at 237 to one of the brackets 209. This lever is vertically disposed and it is actuated by a throw rod 238 to which reciprocatory motion is imparted by a cam 239 carried by the main vertical transmission shaft 16. The lever 236 has pivoted to its upper end at 240 a connecting rod 241 which serves to operate the members by which the labels are applied to the bottles after they have been conducted to said members by the label carrying arms 222.

242 is a shaft journaled in the inner bearer arms 210 at their inner ends and to one end of which is fixed a crank arm 243 that is pivoted at 244 to the connecting rod 241. 245 are stripper arms loosely mounted upon the shaft 242. 246 are presser arms fixed to said shaft 242 and provided at their lower sides with pads 247 which are adapted to press the labels to the bottles when they are brought into contact therewith. The stripper arms 245 are yieldably connected to the presser arms 246 by springs 248, the arms of which are attached to the presser and stripper arms and which preferably have coils 249 fitted to the shaft 242. These springs permit movement of the stripper arms independent of the presser arms, which last named are fixed to the shaft 242.

In the labeling operations, the following actions take place: As the rack bar 213 moves in one direction, it actuates the double segment gear member 216 with the result of imparting such partial rotation to the paste roller carrying arms 227 through the medium of the cam 233 and the connecting rod 229, as to move said paste rollers outwardly onto the paste table to receive paste and then return them to an inner position at a time when the label carrying arms 222 have been moved by the shaft 221 to the position in which they are shown in Figs. XXIV to XXVI inclusive. The arms 227 are then moved in the reverse direction or outwardly and paste is transferred from the paste rollers onto the forks of the label carrying arms. Immediately after the arms 227 have moved outwardly to a sufficient degree to be removed from positions beneath the forks of the label carrying arms, said label carrying arms descend toward the pack of labels in the label holder 234. It should be here mentioned that the labels in said pack are arranged face down and as a consequence, as the forks of the label carrying arms are moved to the packs of labels, the sides of said forks to which paste has been previously applied by the rollers 225 come into contact with the topmost labels so that the labels will adhere to said forks. The label carrying arms then move in a reverse direction by reason of the actuation of the shaft by which they are carried through the medium of the double segment gear 216, and said label carrying arms carry the labels which they have picked up to the opposite end of the labeling mechanism, or in other words to the end of said mechanism at which the stripper arms 245 and presser arms 246 are located. At the time that the label carrying arms are moved to the end of the mechanism at which the stripper and presser arms are located, said stripper arms are in elevated positions to which they are moved by the connecting rod 241 and the parts by which said connecting rod is actuated. Immediately after the label carrying arms with the labels affixed thereto have reached positions beneath the stripper arms and presser arms, said arms are moved downwardly by the actuation of the connecting rod 241 and the stripper arms first pass through the fork of the label carrying arms to separate the labels and carry them to the bottles to be labeled which are located beneath the said arms. Upon the continued actuation of said connecting rod, the shaft 242 is rotated to a sufficient degree to cause such descent of the presser arms 246 as to carry the pads 247 of said arms downwardly over the stripper arms and press the labels tightly to the bottles, it being understood that previous to this action a reverse movement is imparted to the label carrying arms 222, whereby they are removed from the path of travel of the presser arms. After the labels have been affixed to the bottles by the presser arms, said arms and the stripper arms beneath them are returned to their normal positions and the turn table of the machine is again actuated to carry the bottles to the exchange station at which they are removed in their filled, crowned and labeled condition.

I claim:

1. In a bottling machine, a plurality of carriers, a carrier supporting member, means for imparting intermittent movement to said carrier supporting member to carry the carriers from station to station with intervals of rest, means coöperable with each other whereby bottles placed in said carriers may be automatically washed, filled, closed and labeled while they are present in said bottle carriers, and means whereby the bottles are automatically secured to said carriers at the starting station of the machine, substantially as set forth.

2. In a bottling machine, a plurality of carriers, a carrier supporting member, means for imparting intermittent movement to said carrier supporting member to carry the carriers from station to station with intervals of rest, means coöperable with each other whereby bottles placed in said carriers may be automatically washed, filled, closed and labeled while they are present in said bottle carriers, and means whereby the bottles are automatically secured to and released from the carriers at the starting station of the machine, substantially as set forth.

3. In a bottling machine, a plurality of carriers, a carrier supporting member, means for imparting intermittent movement to said carrier supporting member to carry the carriers from station to station with intervals of rest, means coöperable with each other whereby bottles placed in said carriers may be automatically washed, filled, closed and labeled while they are present in said bottle carriers, and means whereby the bottles are automatically adjusted in the carriers and secured thereto at the starting station of the machine, substantially as set forth.

4. In a bottling machine, a turn table, a plurality of bottle carriers hinged to said turn table, means for imparting intermittent movement to said turn table, a guide rail by which the bottle carriers are directed into vertical and horizontal positions at different times, and means coöperable with each other, whereby the bottles placed in said carriers may be automatically washed, filled, closed and labeled while they are present in said bottle carriers, substantially as set forth.

5. In a bottling machine, a turn table, means for imparting intermittent movement to said turn table, turn table detaining means adapted to be actuated by the means for imparting intermittent movement, a plurality of bottle carriers secured to said turn table, means for moving said bottle carriers into vertical and horizontal positions at different times, and means coöperable with each other whereby the bottles placed in said carriers may be automatically washed, filled, closed and labeled, while they are present in said bottle carriers, substantially as set forth.

6. In a bottling machine, bottle washing, filling, closing and labeling mechanisms coöperable with each other, a turn table, means for imparting intermittent movement to said turn table, a plurality of bottle carriers hinged to said turn table and adapted to be conducted thereby to the mechanisms for washing, filling, closing and labeling, and a guide rail surrounding said turn table by which said carriers are directed to travel in lowered positions while being cleansed, and then moved to upright positions to be filled and closed, substantially as set forth.

7. In a bottling machine, bottle washing, filling, closing and labeling mechanisms, coöperable with each other, a turn table, means for imparting intermittent movement to said turn table, a plurality of bottle carriers hinged to said turn table and adapted to be conducted thereby to the mechanism for washing, filling, closing and labeling, a guide rail surrounding said turn table by which said carriers are directed to travel in lowered positions while being cleansed and then moved to upright positions to be filled and closed, and means whereby said carriers are again moved to lowered positions after they have been closed and previous to the bottles being labeled, substantially as set forth.

8. In a bottling machine, a turn table, a plurality of bottle carriers hinged to said turn table and comprising carrier frames and bottle clamping means, and a stationary cam rail by which said clamping means are actuated to permit the introduction and removal of the bottles, substantially as set forth.

9. In a bottling machine, a turn table, a plurality of bottle carriers hinged to said turn table and comprising carrier frames and bottle clamping means, and means whereby the bottles are automatically adjusted longitudinally before they are clamped in the carriers, substantially as set forth.

10. In a bottling machine, a turn table, a plurality of bottle carriers carried by said turn table, adjusting members for shifting the bottles longitudinally in said carriers, and a cam rail by which said bottle adjusting members are actuated, substantially as set forth.

11. In a bottling machine, a turn table, a plurality of bottle carriers carried by said turn table and comprising carrier frames, spring-controlled bottle clamping members operable in said frames, a stationary cam rail for actuating said bottle clamping members, and a guard rail above said cam rail for resisting the upward movements of said carrier frames, substantially as set forth.

12. In a bottling machine, a turn table, a plurality of bottle carriers carried by said turn table, adjusting blocks loosely mounted in said carriers, means for moving said adjusting blocks upwardly in said carriers to shift the bottles longitudinally, and a gage bar for resisting the forward movement of the bottles when they are acted upon by said adjusting blocks, substantially as set forth.

13. In a bottling machine, a turn table, a plurality of bottle carriers carried by said turn table, filling and crowning mechanism comprising a movably supported crowning head, means for moving said crowning head, a crown cap feeder operable in said crowning head, a packing member around said feeder, and means coöperable with the means for moving said crowning head whereby said packing member is moved to produce a liquid-tight joint around said feeder adjacent to said crowning head, substantially as set forth.

In testimony whereof, I have hereunto set my hand this sixth (6) day of November 1908.

SIMON REINSBERG.

In the presence of—
BURGESS S. WAGGENER,
T. P. CASTLE.